(12) United States Patent
Makimura et al.

(10) Patent No.: US 9,515,312 B2
(45) Date of Patent: Dec. 6, 2016

(54) POSITIVE ELECTRODE ACTIVE MATERIAL FOR NON-AQUEOUS SECONDARY BATTERY AND NON-AQUEOUS LITHIUM SECONDARY BATTERY

(71) Applicants: Yoshinari Makimura, Nisshin (JP); Tetsuro Kobayashi, Seto (JP); Hiroki Nagai, Aichi-ken (JP)

(72) Inventors: Yoshinari Makimura, Nisshin (JP); Tetsuro Kobayashi, Seto (JP); Hiroki Nagai, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 352 days.

(21) Appl. No.: 14/368,376

(22) PCT Filed: Dec. 21, 2012

(86) PCT No.: PCT/IB2012/002764
§ 371 (c)(1),
(2) Date: Jun. 24, 2014

(87) PCT Pub. No.: WO2013/098624
PCT Pub. Date: Jul. 4, 2013

(65) Prior Publication Data
US 2015/0010821 A1  Jan. 8, 2015

(30) Foreign Application Priority Data
Dec. 26, 2011  (JP) .................................. 2011-282751

(51) Int. Cl.
*H01M 4/00* (2006.01)
*H01M 4/131* (2010.01)
(Continued)

(52) U.S. Cl.
CPC ............. *H01M 4/131* (2013.01); *C01G 53/50* (2013.01); *H01M 4/485* (2013.01); *H01M 4/502* (2013.01);
(Continued)

(58) Field of Classification Search
CPC ...... H01M 4/131; H01M 4/485; H01M 4/502; H01M 4/505; H01M 4/523; H01M 4/525; H01M 10/052; H01M 10/0525; H01M 2004/028; C01G 53/50; C01P 2002/22; C01P 2002/72; Y02E 60/122
See application file for complete search history.

(56) References Cited

U.S. PATENT DOCUMENTS

2003/0129495 A1* 7/2003 Yamato .................. C01G 41/00
                                                        429/231.1
2003/0170540 A1   9/2003 Ohzuku et al.
(Continued)

FOREIGN PATENT DOCUMENTS

| CN | 1482699 | 3/2004 |
|---|---|---|
| EP | 1 391 950 | 2/2004 |

(Continued)

OTHER PUBLICATIONS

He, Y. S. et al., "Synthesis and Characterization of Submicron-Sized $LiNi_{1/3}Co_{1/3}Mn_{1/3}O_2$ by a Simple Self-Propagating Solid-State Metathesis Method," Science Direct, Journal of Power Sources, vol. 163, pp. 1053-1058, (2007).

*Primary Examiner* — Raymond Alejandro
(74) *Attorney, Agent, or Firm* — Finnegan, Henderson, Farabow, Garrett & Dunner, LLP (57) ABSTRACT

A lithium secondary battery (10) includes a positive electrode active material of lithium transition metal oxide which contains at least a nickel element and a manganese element as transition metals and for which, with respect to a diffraction peak A located at a diffraction angle 2θ of 17° to 20° and (Continued)

[EXAMPLE 1]

a diffraction peak B located at a diffraction angle $2\Theta$ of $43°$ to $46°$ from X-ray diffraction measurements, when the integrated intensity ratio is $R_1=I_A/I_B$, the peak intensity ratio is $R_H=H_A/H_B$, and the ratio between the integrated intensity ratio $R_1$ and the peak intensity ratio $R_H$ is $S_F=R_H/R_1\gg$ the $S_F$ satisfies $1.1\leq SF\leq 2.2$.

7 Claims, 3 Drawing Sheets

(51) Int. Cl.
*H01M 4/505* (2010.01)
*H01M 4/525* (2010.01)
*H01M 10/0525* (2010.01)
*C01G 53/00* (2006.01)
*H01M 4/485* (2010.01)
*H01M 4/50* (2010.01)
*H01M 4/52* (2010.01)
*H01M 4/02* (2006.01)

(52) U.S. Cl.
CPC ............. *H01M 4/505* (2013.01); *H01M 4/523* (2013.01); *H01M 4/525* (2013.01); *H01M 10/0525* (2013.01); *C01P 2002/22* (2013.01); *C01P 2002/72* (2013.01); *C01P 2002/74* (2013.01); *C01P 2004/03* (2013.01); *H01M 2004/028* (2013.01); *Y02E 60/122* (2013.01)

(56) References Cited

U.S. PATENT DOCUMENTS

| | | |
|---|---|---|
| 2004/0126660 A1 | 7/2004 | Ohzuku et al. |
| 2009/0220860 A1* | 9/2009 | Xi .......................... C01G 30/00 429/220 |
| 2010/0233542 A1* | 9/2010 | Endo ..................... H01M 4/505 429/223 |
| 2012/0270106 A1 | 10/2012 | Todorov et al. |

FOREIGN PATENT DOCUMENTS

| | | |
|---|---|---|
| EP | 2 071 650 | 6/2009 |
| EP | 2 144 314 | 1/2010 |
| JP | 2000-195514 | 7/2000 |
| JP | 2010-86690 | 4/2010 |
| WO | WO 02/078105 | 10/2002 |
| WO | WO 02/086993 | 10/2002 |
| WO | WO 2011/065408 | 6/2011 |

* cited by examiner

[EXAMPLE 1]

POSITIVE ELECTRODE ACTIVE MATERIAL FOR NON-AQUEOUS SECONDARY BATTERY AND NON-AQUEOUS LITHIUM SECONDARY BATTERY

CROSS-REFERENCE TO RELATED APPLICATIONS

This application is a national phase application of International Application No. PCT/IB2012/002764, filed Dec. 21, 2012, and claims the priority of Japanese Application No. 2011-282751 filed Dec. 26, 2011, the content of both of which is incorporated herein by reference.

BACKGROUND OF THE INVENTION

1. Field of the Invention

The invention relates to a positive electrode active material for a non-aqueous secondary battery, and to a non-aqueous lithium secondary battery.

2. Description of Related Art

Complex oxides of layered structure formed of a combination of lithium, nickel and manganese are being examined as positive electrode active material for non-aqueous lithium secondary battery. For instance, in the lithium nickel complex oxides, when the full widths at half maximum of the diffracted peaks at planes (003) and (104) in the Miller indices hid of a powder X-ray diffraction using CuKα beam are respectively FWHM(003) and FWHM(104) and the integrated intensities of the diffraction peaks are defined as I(003) and I(104) respectively, those satisfying 0.75≤FWHM(003)/FWHM(104)≤0.9 and 0.25≤I(104)/I(003)≤0.9 are proposed to be desirable as positive electrode active materials (for instance, see Japanese Patent Application Publication No. 2000-195514 (JP 2000-195514 A)). As a reason for this, FWHM(003)/FWHM(104) is an index of the c-axis orientation and the ratio of integrated intensities I(104)/I(003) is an index of contamination of Ni ions into Li ion sites and reactivity of the active material and the electrolytic solution. That is to say, if FWHM(003)/FWHM (104) becomes small, while the c-axis orientation in the trigonal system becomes higher, if it falls outside the range described above, it is not desirable from the points of view of crystal growth in a direction perpendicular to the c-axis, and extension and contraction in the c-axis direction. In addition, in case I(104)/I(003) exceeds 0.9, because large amounts of Ni ions contaminate the Li ion sites, the amount of Li ions that can be stored/released diminishes while at the same time the large current charge-discharge characteristics decrease. Therefore, it is not desirable as a positive electrode active material. If I(104)/I(003) becomes less than 0.25, because the active material and the electrolytic solution tend to react. Therefore, it is not desirable as a positive electrode active material.

In addition, Li[Li$_x$(Ni$_{1/2}$Mn$_{1/2}$)$_{1-x}$]O$_2$ (0≤x≤0.3), which is an oxide with a layered structure formed of a combination of lithium, nickel and manganese, in which the errors in the proportions of nickel and manganese are within 10 atom % has been proposed as a positive electrode active material (for instance, see WO2002/078105). Here, a positive electrode active material that satisfies I(003)/I(104)<1 for the integrated intensity ratio of the X-ray diffraction peaks assigned to the Miller indices (003) and (104) is deemed desirable.

However, with the non-aqueous lithium secondary battery of the JP 2000-195514 A described above, while capacity increase, or the like, was intended by taking the integrated intensity ratio, or the like, of the X-ray diffraction peaks into consideration, it was still not sufficient. For instance, with car batteries, or the like, in addition to the capacity deterioration being small even if repeatedly charged-discharged in temperature conditions from a low temperature on the order of −30° C. to a high temperature on the order of 60° C., the internal resistance increase of the battery needs to be kept small. Thus, a further improvement of the output characteristics of the battery was sought.

SUMMARY OF THE INVENTION

The invention provides a positive electrode active material for a non-aqueous secondary battery, which can further improve output characteristics and high-temperature durability, and a non-aqueous lithium secondary battery.

The present inventors discovered that the output characteristics and high-temperature durability could be further improved when rendering suitable the peak shapes of the diffraction peak A located at a diffraction angle 2θ of 17° to 20° and the diffraction peak B at a diffraction angle 2θ of 43° to 46° when X-ray diffraction measurements are performed, and reached completion of the invention.

A first aspect of the invention relates to a positive electrode active material for a non-aqueous secondary battery having a crystal particle of a lithium transition metal oxide containing at least a nickel element and a manganese element as transition metals, and having a layered structure. With respect to a first diffraction peak located at a diffraction angle 2θ of 17° to 20° and a second diffraction peak located at a diffraction angle 2θ of 43° to 46° when an X-ray diffraction measurement is performed on a crystal structure of the crystal particle using a Cu tube, when a first integrated intensity of a first diffraction peak located at a diffraction angle 2θ of 17° to 20° is defined as I$_A$, a second integrated intensity of a second diffraction peak located at a diffraction angle 2θ of 43° to 46° is defined as I$_B$, an integrated intensity ratio between the first integrated intensity and the second integrated intensity is defined as R$_I$, a first height of the first diffraction peak is defined as H$_A$, a second height of the second diffraction peak is defined as H$_B$, and a peak intensity ratio between the first height and the second height is defined as R$_H$, the following relationships are satisfied:

$$R_I = I_A/I_B$$

$$R_H = H_A/H_B$$

$$S_F = R_H/R_I, \text{ and}$$

$$1.1 \leq S_F \leq 2.2.$$

A second aspect of the invention relates to a non-aqueous lithium secondary battery provided with a positive electrode that contains the positive electrode active material quality for a non-aqueous secondary battery described above, a negative electrode that stores/releases lithium, and a non-aqueous ion-conducting medium that is intercalated between the positive electrode and the negative electrode and conducts lithium.

The positive electrode active material for a non-aqueous secondary battery and the non-aqueous lithium secondary battery of the invention can further improve output characteristics and high-temperature durability. While the reasons for obtaining such effects are not clear, the following can be speculated. For instance, they are inferred to be due to the layer structure becoming more optimal in the lithium transition metal oxide having a layered structure containing nickel and manganese, if the S$_F$ value is used to quantify the shape of the diffraction peak B with respect to the shape of the diffraction peak A, when this $S_F$ value satisfies $1.1 \leq S_F \leq 2.2$. It is inferred for this reason that output characteristics and high-temperature durability can be improved further, such as, for instance, output characteristics at low temperature and capacity retention at high temperatures.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The positive electrode active material for a non-aqueous secondary battery of the present embodiment is one in which, with respect to the diffraction peak A located at a diffraction angle 2θ of 17° to 20° and the diffraction peak B at a diffraction angle 2θ of 43° to 46° when X-ray diffraction measurements are performed using a Cu tube, if the integrated intensity ratio is $R_I = I_A/I_B$, the peak intensity ratio is $R_H = H_A/H_B$, and the ratio between the integrated intensity ratio $R_I$ and the peak intensity ratio $R_H$ is $S_F = R_H/R_I$, then the $S_F$ value satisfies $1.1 \leq S_F \leq 2.2$, in the crystal structure of a crystal particle of a lithium transition metal oxide containing at least a nickel element and a manganese element as transition metals, and having a layered structure. Herein, $I_A$ and $I_B$ are an integrated intensity of the diffraction peak A and an integrated intensity of the diffraction peak B, respectively. $H_A$ and $H_B$ are a height of the diffraction peak A and a height of the diffraction peak B, respectively.

Output characteristics and high-temperature durability can be improved further with this positive electrode active material for a non-aqueous secondary battery. Reasons such as the following, for instance, are considered for this. Generally, a lithium transition metal oxide that is formed of a combination of nickel and manganese and has a layered structure assumes a superlattice structure in which Li, Ni and Mn interact with each other and are regularly arrayed within a transition metal layer. The influence of interferences among transition metal elements also appears in the electronic state, which is formed of, not $Ni^{3+}$ and $Mn^{3+}$ inferred from solid solution formation, but $Ni^{2+}$ and $Mn^{4+}$ in $LiNi_{1/2}Mn_{1/2}O_2$. While the electronic state changes according to the Li amount and the proportion of Ni/Mn, the electronic state can be depicted as a combination of $Ni^{2+}$, $Ni^{3+}$ and $Mn^{4+}$. This crystal structure and electronic state are the same even when a transition metal element M is included (for instance, M is at least one element among Co, Al, Fe, Cr and Mg), and a singular electronic state that is different from a solid solution formation is taken to become a superlattice structure regularly arrayed within a transition metal layer. Meanwhile, in contrast to metal ions being regularly arrayed within the transition metal layer, the oxide described above, being a layered structure, has arbitrariness in the layering pattern of the transition metal layers. In other words, in contrast to the transition metal layers being layered at random when no interaction at all works in the layering direction, when interactions occur in the layering direction a layered structure having regularity in the layering pattern may be taken. In this case, it is thought that the extent of irregularity and regularity in the layering direction can be depicted by comparing the shapes of a diffraction peak A located at a diffraction angle 2θ of 17° to 20° when X-ray diffraction measurements are performed using a Cu tube and a diffraction peak B located at a diffraction angle 2θ of 43° to 46°. When the shape of the diffraction peak B with respect to the shape of the diffraction peak A was quantified using the $S_F$ value, the $S_F$ value was found to have a tendency to become higher when regularity in the layering direction was high, and it was inferred to become more optimal when this $S_F$ value satisfies $1.1 \leq S_F \leq 2.2$. While the relationship between this $S_F$ value and the output characteristics and the causes for the performance improving effects have not been elucidated sufficiently, it is inferred that in the case of a sample in which regularity is high and interactions are large in the layering direction, at the same time as the transport of lithium ions within the solid becomes rapid, the layered structure is stabilized even in an oxidation state in which a lithium ion has been released, becoming a positive electrode material having excellent output characteristics and charge-discharge durability. It is thought that when the $S_F$ value is lower than 1.1, the interactions in the layering direction are insufficient, and that when the $S_F$ value is greater than 2.2, the interactions in the layering direction become extremely strong, and the lithium ion transport inside the solid is inhibited. This $S_F$ value is more preferably 1.5 or greater, and even more preferably 1.8 or greater. If the $S_F$ value is larger, for instance, low-temperature characteristics and capacity retention at high temperatures show a tendency to become higher, which is desirable.

The positive electrode active material for a non-aqueous secondary battery of the present embodiment may be one in which the $R_L$ value satisfies $1.3 < R_L < 2.1$ when the ratio between the maximum diameter $L_H$ and the minimum diameter $L_W$ of the primary particles of lithium transition metal oxide is $R_L = L_H/L_W$. In this way, output characteristics and high-temperature durability can be improved further. The reasons for this is thought to be, for instance, related to the primary particles displaying, not a flat-shaped primary particle shape expected from the characteristics of a layered structure, but three-dimensional scaffold-like characteristics with the influence of the interactions in the layering direction, and becoming near-spherical. It is thought that when the ratio $R_L$ is under 1.3, the interactions in the layering direction are not sufficient, and when the ratio $R_L$ is above 2.1, the transportation distance of lithium ions within the solid becomes longer, thereby decreasing the performance. Here, for the "$R_L$ value", the active material powder is observed with a SEM, 10 primary particles are arbitrarily chosen from the observation images, and, with the maximum diameter and the minimum diameter of the primary particle being $L_H$ and $L_W$ respectively, the mean value of the $L_H/L_W$ ratios of these 10 primary particles is the $R_L$ value. This $R_L$ value is more preferably 1.5 or greater, and even more preferably 1.8 or greater. If the $R_L$ value is larger, for instance, low-temperature characteristics and capacity retention at high temperatures show a tendency to become higher, which is desirable. In addition, the $R_L$ value is more preferably 2.0 or lower, and even more preferably 1.9 or lower.

The positive electrode active material for a non-aqueous secondary battery of the present embodiment may be one in which the distance D (nm) between the transition metal layers of the layered structure of the lithium transition metal oxide satisfies $0.4733 \leq D \leq 0.4778$. In this way, the output characteristics and high-temperature durability can be improved further. The reason for this is thought to be that, for instance, with a layered lithium transition metal oxide containing nickel and manganese, if the D value is 0.4733 (nm) or greater, the interactions in the layering direction are large, the regularity in the layering direction is high, and the transport of lithium ions within the solid becomes fast, thereby improving performance. Meanwhile, with a layered lithium transition metal oxide containing nickel and manganese, if the D value exceeds 0.4778 (nm), it is thought that a contamination of nickel ions into the lithium layer occurs, and excellent characteristics cannot be obtained due to the nickel ions hindering lithium ion transport. Here, the "D value" is calculated by measuring a positive electrode active material for a non-aqueous secondary battery by X-ray diffractometry using a Cu tube and optimizing using the least square method from the diffraction angle and the Miller indices of each diffraction peak. This distance D is more preferably 0.4770 (nm) or less. If the distance D is smaller, for instance low-temperature characteristics and capacity retention at high temperatures show a tendency to become higher, which is desirable. In addition, the distance D is more preferably 0.4735 or greater, and even more preferably 0.4738 or greater. Experimental results were obtained, in which the charge-discharge characteristics worsened as the D value became larger, and the battery characteristics became extremely bad when 0.4733 (nm) was exceeded in the case of other lithium transition metal oxides having a layered structure, for instance, $LiNiO_2$ and analog thereof. The features regarding this $S_F$ value and D value are thought to be phenomena that are unique to layered compounds in which nickel and manganese coexist. It is thought that when the D value of $LiNiO_2$ and analog thereof exceeds 0.4733 (nm), it means that substantial amounts of nickel ion preventing the movement of lithium ion are present in the lithium ion conduction path, and battery characteristics worsen for this reason.

In the positive electrode active material for a non-aqueous secondary battery of the present embodiment, the lithium transition metal oxide is preferably represented by the composition formula $Li_{1+Z}(Ni_{1-X-Y}Mn_XM_Y)_{1-Z}O_2$ (where M is one or more element among Co, Al, Fe, Cr and Mg, $0 \leq Z \leq 0.2$, $0<X<0.5$ and $0 \leq Y<0.4$). In addition, the element M is more preferably contained with the condition $0<Y<0.4$. In this way, it is more stable, charge-discharge characteristics can be improved. In this case, for the lithium transition metal oxide, M in the composition formula is preferably Co and Al, and more preferably Co. In this way, it is more stable, charge-discharge characteristics can be improved.

In the positive electrode active material for a non-aqueous secondary battery of the present embodiment, the lithium transition metal oxide is preferably doped with one or more elements among Zr, W, Sr and Nb. In contrast to the element M, which improves performance by being substituted in the transition metal layer within the positive electrode active material, when at least one element among Zr, W, Sr and Nb is doped, the doped element is inferred to be present on the surface and boundary surface of the crystal particle, improving battery performance by providing the effect of strengthening the interactions locally at the particle interface. In particular, when the doping amount is in the range of 0.01 mol % or greater but 3 mol % or less with respect to the total amounts of elements Ni and Mn and element M, the output characteristics and high-temperature durability can be improved further, which is desirable. The lithium transition metal oxide is more preferably doped with the elements Zr and W, and even more preferably doped with both of the elements Zr and W.

In the following, production methods for the positive electrode active material for the non-aqueous secondary battery of the present embodiment will be described. A complex oxide containing a nickel element and a manganese element, for instance, may be one prepared by a co-precipitation method. As the preparation method, it may be one containing a precursor preparation step for obtaining a precursor by co-precipitating transition elements containing a nickel element and a manganese element, a mixing step for obtaining a mixed powder by mixing a lithium salt to the precursor, and a firing step for firing the mixed powder. The positive electrode active material for a non-aqueous secondary battery may be produced using methods other than the co-precipitation method.

In the precursor generation step, for instance, as the co-precipitation method, the hydroxide co-precipitation method for preparing a hydroxide precursor in which transition metal ions coexist within one particle can be used. With this hydroxide co-precipitation method, it is possible to mix more uniformly the transition metal elements at the atomic level. Among the transition metal elements used as starting raw materials, since manganese is prone to oxidation in the solution where the precursor of the co-precipitation method is obtained, and obtaining a hydroxide precursor in which transition metal ions are distributed uniformly is not straightforward, it is desirable that the interior of the reaction solution is turned into an inert atmosphere. As a method for turning the interior of a reaction solution into inert atmosphere, it may be one whereby dissolved oxygen is removed by aerating an inert gas inside the aqueous solution. In addition, while the hydroxide precursor is preferably a compound in which a nickel element, a manganese element and a metal element M (M is at least one element among Co, Al, Fe, Cr and Mg) have been mixed uniformly, a salt of metal element M may be mixed to a hydroxide precursor in which a nickel element and a manganese element have been mixed uniformly. In this way, a lithium transition metal oxide represented by the composition formula $Li_{1+Z}(Ni_{1-X-Y}Mn_XM_Y)_{1-Z}O_2$ (where M is one or more element among Co, Al, Fe, Cr and Mg, $0 \leq Z \leq 0.2$, $0<X<0.5$ and $0 \leq Y<0.4$) can be produced. However, the precursor and the salt are not limited to hydroxides, and salts such as carbonates and citrates can be used similarly as long as they are insoluble salts in which elements have been mixed uniformly at atomic level. In addition, it is possible to use a complexing agent to prepare a precursor with a higher density. For the raw materials of the precursor, nickel sulfate, nickel nitrate, nickel acetate, nickel hydroxide, nickel carbonate, basic nickel carbonate, and the like, as nickel sources, and manganese sulfate, manganese nitrate, manganese acetate, manganese oxide, manganese carbonate, and the like, as manganese sources, can be cited as an example. As raw materials, not those that are dependent on morphology but those with any morphology can be used as long as they form basic aqueous solutions; however, preferably, using a metal salt with high solubility is adequate.

In the mixing step, the precursor and the lithium salt are mixed to obtain a mixed powder. As the lithium salt, lithium hydroxide, lithium carbonate, lithium nitrate, lithium acetate, and the like, can be used, of which lithium hydroxide is used preferably. For the mixing proportions of lithium and transition metals, the ratio ML/ME between the number of moles ML (mol) of lithium and the total number of moles ME (mol) of transition metal elements in a range of 1.03 or greater but 1.50 or less is desirable. The transition metal elements contain a nickel element and a manganese element, and may further contain Co. With this range of ratio ML/ME, bringing it to satisfy $1.1 \leq S_F \leq 2.2$ is facilitated. Therefore, output characteristics and high-temperature durability can be improved further. This ratio ML/ME is more preferably 1.40 or lower, and even more preferably 1.30 or lower. In addition, the ratio ML/ME is more preferably 1.04 or greater, and even more preferably 1.05 or greater. In this way, bringing it to satisfy $1.1 \leq S_F \leq 2.2$ is facilitated. In addition, in the mixing step, one or more additive element among Zr, W, Sr and Nb is further mixed preferably. As this additive element, Zr and W are more desirable, and adding both Zr and W is further desirable. In this way, output characteristics and high-temperature durability can be improved further. As addition amount, the output characteristics and high-temperature durability can be improved further if the ratio MA/ME between the number of moles MA of the additive element and the total number of moles ME of the transition metal elements (Ni, Mn and Co) is in a range of 0.0001 or greater but 0.03 or less, which is desirable. The additive element can be added, for instance, as a sulfate, a nitrate, an acetate, a hydroxide, a carbonate, a basic carbonate or the like.

In the firing step, the mixed powder of precursor and lithium salt is fired as-is, or formed and fired. Firing is to be carried out under the co-presence of oxygen and is carried out, for instance, in atmosphere. While the firing temperature tends to be somewhat different depending on the composition, performing in a range of 750° C. or higher but 1,000° C. or lower is desirable. In this way, bringing it to satisfy $1.1 \leq S_F \leq 2.2$ is facilitated. Therefore, output characteristics and high-temperature durability can be improved further. For instance, those for which the composition formula is $Li_{1+Z}(Ni_{0.33}Mn_{0.33}Co_{0.33})_{1-Z}O_2$ ($0 \leq Z \leq 0.2$) are more preferably fired in a range of 850° C. or higher but 1,000° C. or lower, and even more preferably fired in a range of 870° C. or higher but 980° C. or lower. In addition, regarding those for which the composition formula is $LiNi_{0.5}Mn_{0.5}O_2$, firing in a range of 850° C. or higher but 1,000° C. or lower is more desirable, and firing in a range of 890° C. or higher but 980° C. or lower is even more desirable. In addition, regarding those for which the composition formula is $LiNi_{0.7}Mn_{0.3}O_2$, firing in a range of 750° C. or higher but 900° C. or lower is more desirable, and firing in a range of 800° C. or higher but 880° C. or lower is even more desirable. In addition, regarding those for which the composition formula is $LiNi_{0.7}Mn_{0.2}Co_{0.1}O_2$, firing in a range of 800° C. or higher but 1,000° C. or lower is more desirable, and firing in a range of 860° C. or higher but 940° C. or lower is even more desirable. In addition, regarding those for which the composition formula is $LiNi_{0.33}Mn_{0.33}Co_{0.23}Al_{0.1}O_2$, firing in a range of 850° C. or higher but 1,000° C. or lower is more desirable, and firing in a range of 880° C. or higher but 980° C. or lower is even more desirable. The lithium transition metal oxide of the present embodiment can be produced in this manner.

The non-aqueous lithium secondary battery of the present embodiment includes a positive electrode containing any positive electrode active material for a non-aqueous secondary battery described above, a negative electrode for storing/releasing lithium, and a non-aqueous ion-conducting medium intercalated between the positive electrode and the negative electrode for conducting lithium.

The positive electrode of the lithium secondary battery of the present embodiment may be formed, for instance, by mixing a positive electrode active material, a conductive material and a binding material, adding a suitable solvent turning them into a positive electrode material in paste form, which is coated onto the surface of a collector and died, and as necessary, compressed so as to increase the electrode density. The conductive material is not limited in particular as long as it is an electron-conductive material that does not exert a negative impact on the battery performance of the positive electrode and, it is possible to use, for instance, among graphites such as natural graphite (scaly graphite, flake graphite) and artificial graphite, acetylene black, carbon black, ketchen black, carbon whisker, needle cokes, carbon fiber, metals (copper, nickel, aluminum, silver, gold and the like) and the like, one species or two or more species by mixing. Among these, carbon black and acetylene black are desirable as conductive materials from the point of view electron-conductivity and coating ability. The binding material fulfills the role of binding active material particles and conductive material particles, for instance, fluorine-containing resins such as polytetrafluoroethylene (PTFE), polyvinylidene fluoride (PVDF) and fluorine rubber, or thermoplastic resins such as polypropylene and polyethylene, ethylene-propylene-dienemer (EPDM), sulfonated EPDM, natural butyl rubber (NBR), and the like, can be used alone or as a mixture of two or more species. In addition, cellulosic or styrene butadiene rubber (SBR) water dispersions or the like, which are aqueous binders can also be used. As solvents for dispersing the positive electrode active material, the conductive material and the binding material, for instance, organic solvents such as N-methyl pyrrolidone, dimethyl formamide, dimethyl acetamide, methylethyl ketone, cyclohexanone, methyl acetate, methyl acrylate, diethyltriamine, N,N-dimethylaminopropyl amine, ethylene oxide and tetrahydrofuran can be used. In addition, the active material may be slurried with a latex such as SBR by adding a dispersant, a thickener, and the like, to water. As the thickener, for instance, polysaccharides such as carboxymethyl cellulose and methyl cellulose can be used alone or as a mixture of two or more species. As coating methods, for instance, roller coating such as an applicator roll, screen coating, doctor blade method, spin coating, bar coater, and the like, may be cited, any among these can be used to turn the material into an arbitrary thickness/shape. As the collector, in addition to aluminum, titanium, stainless steel, nickel, iron, baked carbon, conductive polymer, conductive glass and the like, for the purpose of improving adhesive property, electric conductivity and resistance to oxidation, those with the surface of aluminum, copper or the like, treated with carbon, nickel, titanium, silver or the like, can be used. Regarding these, the surface can also be treated by oxidation. Regarding the shape of the collector, those that are foil-shaped, film-shaped, sheet-shaped, net-shaped, punched or expanded body, lath body, porous body, foam body, organizer of fiber group, and the like, may be cited. For the thickness of the collector, for instance, those that are 1 to 500 μm are used.

The negative electrode of the lithium secondary battery of the present embodiment may be formed, for instance, by mixing a negative electrode active material, a conductive material and a binding material, adding a suitable solvent turning them into a negative electrode material in paste form, which is coated onto the surface of a collector and died, and as necessary, compressed so as to increase the electrode density. As the negative electrode active material, while inorganic compounds such as lithium, lithium alloys and tin compounds, titan oxides such as $Li_4Ti_5O_{12}$ and $TiO_2$, other metal oxides, carbon materials capable of storing/releasing lithium ions, electric conductive polymers, and the like, may be cited, among these, carbon materials are desirable. While this carbon material is not limited in particular, cokes, glassy carbons, graphites, non-graphitizable carbons, pyrolytic carbons, carbon fibers, and the like, may be cited. Of these, graphites such as artificial graphite and natural graphite are desirable, as they have operating electric potential close to that of metal lithium, are capable of charging-discharging at high operating voltages, suppressing self-discharge when lithium salt is used as an electrolyte salt, and can reduce irreversible capacity at charging time. In addition, as the conductive material, binding material, solvent, and the like, used in the negative electrode, those given as examples in the positive electrode can be used respectively. For the collector of the negative electrode, in addition to copper, nickel, stainless steel, titanium, aluminum, baked carbon, conductive polymer, conductive glass, Al—Cd alloy, and the like, for the purpose of improving the adhesive property, electric conductivity and resistance to reduction, for instance, those with the surface of copper or the like, treated with carbon, nickel, titanium, silver or the like can be used. Regarding these, the surface can also be treated by oxidation. The shape of the collector can use the same ones as the positive electrode.

As the ion-conducting medium of the lithium secondary battery of the present embodiment, a non-aqueous electrolytic solution, a non-aqueous gel electrolytic solution, or the like, containing a support salt, can be used. As solvent of the non-aqueous electrolytic solution, carbonates, esters, ethers, nitriles, furans, sulfolanes and dioxolanes, and the like, may be cited; these may be used alone or mixed. Concretely, as carbonates, cyclic carbonates such as ethylene carbonate, propylene carbonate, vinylene carbonate, butylene carbonate and chloroethylene carbonate, open chain carbonates such as dimethyl carbonate, ethylmethyl carbonate, diethyl carbonate, ethyl-n-butyl carbonate, methyl-t-butyl carbonate, di-i-propyl carbonate and t-butyl-i-propyl carbonate, cyclic esters such as γ-butyl lactone and γ-valerolactone, open chain esters such as methyl formate, methyl acetate, ethyl acetate and methyl butyrate, ethers such as dimethoxy ethane, ethoxy methoxy ethane and diethoxy ethane, nitriles such as acetonitrile and benzonitrile, furans such as tetrahydrofuran and methyl tetrahydrofuran, sulfolanes such as sulfolane and tetramethyl sulfolane, dioxolanes such as 1,3-dioxolane and methyl dioxolane, and the like, may be cited. Among these, a combination of cyclic carbonates and open chain carbonates is desirable. According to this combination, not only the cycle characteristics, which represent the battery characteristics in the repetition of charge-discharges, are excellent, but also the viscosity Of the electrolytic solution, the capacitance of the obtained battery, the battery output, and the like, can be balanced. Cyclic carbonates, with relatively high relative permittivities, are thought to increase the permittivity of the electrolytic solution, and open chain carbonates are thought to hold down the viscosity of the electrolytic solution.

For the support salts contained in the lithium secondary battery of the present embodiment, for instance, $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, LiSCN, $LiClO_4$, LiCl, LiF, LiBr, LiI, $LiAlCl_4$, and the like, may be cited. Among these, using one species or two or more species of salt in combination, selected from the group consisting of inorganic salts such as $LiPF_6$, $LiBF_4$, $LiAsF_6$ and $LiClO_4$, and organic salts such as $LiCF_3SO_3$, $LiN(CF_3SO_2)_2$ and $LiC(CF_3SO_2)_3$, is desirable when viewed from the point of electric characteristics. For this electrolyte salt, the concentration in the non-aqueous electrolytic solution is preferably 0.1 mol/L or greater but 5 mol/L or less, and more preferably 0.5 mol/L or greater but 2 mol/L or less. If the concentration of the electrolyte salt is 0.1 mol/L or greater, a sufficient current density can be obtained, and at 5 mol/L or less, the electrolytic solution can be stabilized further. In addition, a flame-retardant such as of the phosphorous series or halogen series may be added to this non-aqueous electrolytic solution.

In addition, alternatively to a liquid ion-conducting medium, a solid ion-conducting polymer can also be used as the ion-conducting medium. As the ion-conducting polymer, for instance, a polymer gel constituted from a polymer such as acrylonitrile, ethylene oxide, propylene oxide, methyl methacrylate, vinyl acetate, vinyl pyrrolidone, PVDF, and a support salt, can be used. Furthermore, an ion-conducting polymer and a non-aqueous electrolytic solution can also be used in combination. In addition, aside from an ion-conducting polymer, an inorganic solid electrolyte or a mixed material of an organic polymer electrolyte and an inorganic solid electrolyte, or an inorganic solid powder bound by an organic binder, or the like, can be used as the ion-conducting medium.

The lithium secondary battery of the present embodiment may be provided with a separator between the negative electrode and the positive electrode. As the separator, while there is no particular limitation as long as it has a composition that may resist the range of use of the lithium secondary battery, for instance, polymer non-woven fabrics such as non-woven fabric made of polypropylene and non-woven fabric made of polyphenylene sulfide, and thin microporous films of olefinic resins such as polyethylene and polypropylene, may be cited. These may be used alone or by mixing a plurality thereof.

Figure 1:
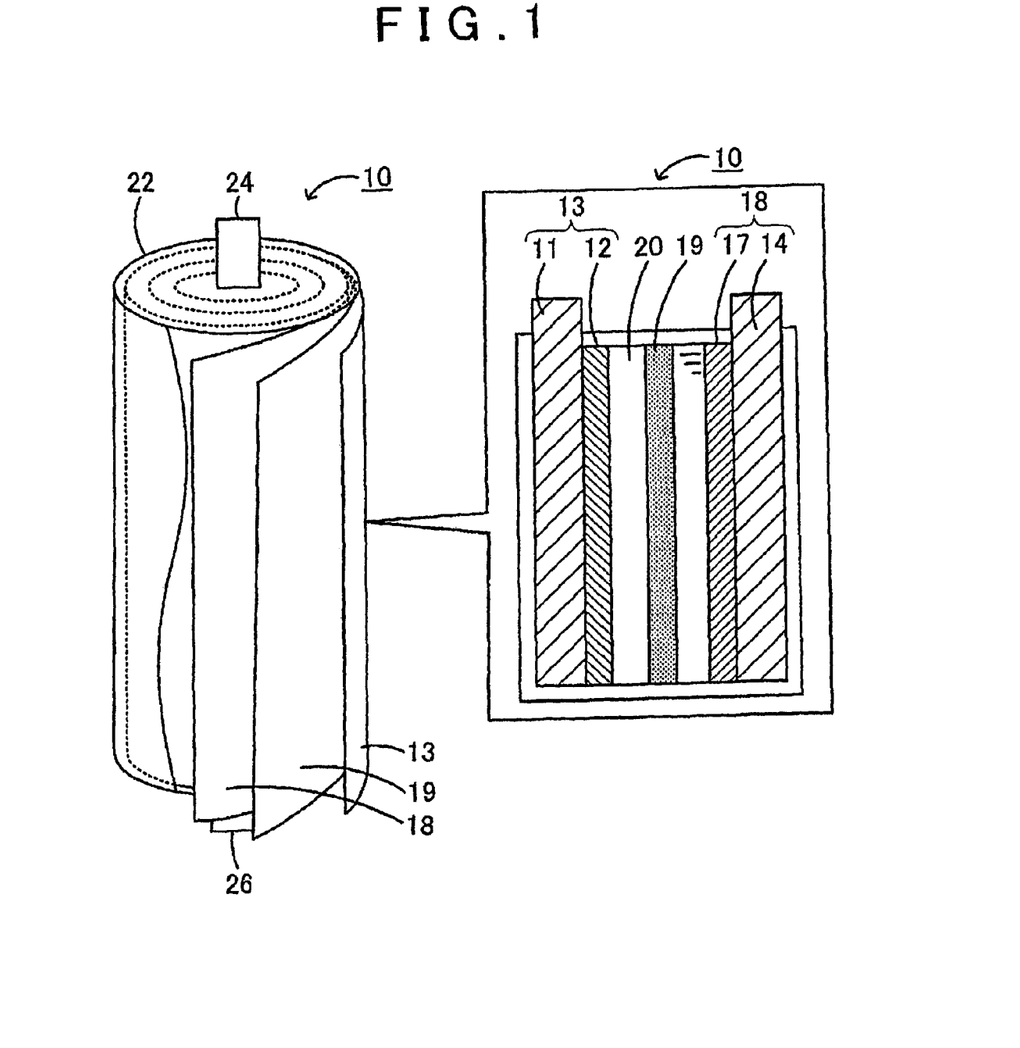
FIG. 1 is a schematic diagram showing an example of lithium secondary battery 10 of Example of the invention.

While the shape of the lithium secondary battery of the present embodiment is not limited in particular, for instance coin-type, button-type, sheet-type, layered-type, cylinder-type, flat-type, square-type, and the like, may be cited. In addition, it may be applied to large ones, such as used in electric cars and the like. FIG. 1 is a schematic diagram showing an example of a lithium secondary battery 10 of the present embodiment. This lithium secondary battery 10 is provided with a positive electrode sheet 13 having a positive electrode mixture layer 12 formed on a collector 11, a negative electrode sheet 18 having a negative electrode mixture layer 17 formed on the surface of a collector 14, a separator 19 provided between the positive electrode sheet 13 and the negative electrode sheet 18, and an ion-conducting medium 20 (non-aqueous electrolytic solution) filling the space between the positive electrode sheet 13 and the negative electrode sheet 18. This lithium secondary battery 10 is formed by sandwiching the separator 19 between the positive electrode sheet 13 and the negative electrode sheet 18, rolling and inserting these into a cylindrical case 22, and arranging a positive terminal 24 connected to the positive electrode sheet 13 and a negative terminal 26 connected to the negative electrode sheet 18. For the positive electrode active material of this lithium secondary battery 10, with respect to the diffraction peak A located at a diffraction angle 2θ of 17° to 20° and the diffraction peak B at a diffraction angle 2θ of 43° to 46° when X-ray diffraction measurements are performed using a Cu tube, if the integrated intensity ratio is $R_I=I_A/I_B$, the peak intensity ratio is $R_H=H_A/H_B$, and the ratio between the integrated intensity ratio $R_I$ and the peak intensity ratio $R_H$ is $S_F=R_H/R_I$, then the $S_F$ value satisfies $1.1 \leq S_F \leq 2.2$, in the crystal structure of a crystal particle of a lithium transition metal oxide containing at least a nickel element and a manganese element as transition metals, and having a layered structure.

With the positive electrode active material for a non-aqueous secondary battery of the present embodiment described above, since the $S_F$ value, which is calculated using the integrated intensity ratio and the peak intensity ratio between the diffraction peak A located at a diffraction angle 2θ of 17° to 20° and the diffraction peak B located at a diffraction angle 2θ of 43° to 46° when X-ray diffraction measurements are performed, satisfies $1.1 \leq S_F \leq 2.2$, and the layer structure becomes more optimal, output characteristics and high-temperature durability can be improved further, such as the output characteristics at low temperature and capacity retention at high temperatures. In addition, when the ratio between the maximum diameter $L_H$ and the minimum diameter $L_W$ of the primary particles of lithium transition metal oxide is $R_L = L_H/L_W$, the $R_L$ value satisfies $1.3 < R_L < 2.1$, demonstrating three-dimensional framework-like characteristics with the influence of the interactions in the layering direction, such that output characteristics and high-temperature durability can be improved further. Furthermore, since the distance D (nm) between the transition metal layers of the layered structure of lithium transition metal oxide satisfies $0.4733 \leq D \leq 0.4778$, and regularity in the layering direction is high, output characteristics and high-temperature durability can be improved further.

The invention may be carried out in a variety of modes as long as they belong to the technical scope of the invention, without being limited in any way to the embodiments described above.

Hereinafter, a case in which the lithium secondary battery of the present embodiment was concretely produced will be described as an example.

Example 1

In an ion-exchanged water from which dissolved oxygen was removed beforehand by aerating with an inert gas, nickel sulfate, manganese sulfate and cobalt sulfate were dissolved so that each element from Ni, Mn and Co was at a molar ratio of 0.33:0.33:0.33, and the mixed aqueous solution was adjusted so that the total molar concentration of these metal elements was 2 mol/L. Meanwhile, using an ion-exchanged water from which dissolved oxygen was removed similarly, 2 mol/L of an aqueous solution of sodium hydroxide and 0.352 mol/L of aqueous ammonia were respectively adjusted. An ion-exchanged water from which dissolved oxygen was removed was introduced into a reaction tank set to a tank internal temperature of 50° C. in a stirred state at 800 rpm, an aqueous solution of sodium hydroxide was added therein dropwise and adjusted so that the pH was 12 when 25° C. liquid temperature served as standard. The mixed aqueous solution, the aqueous solution of sodium hydroxide and aqueous ammonia were added to the reaction tank while being controlled to pH 12 to obtain a complex hydroxide, which was the co-precipitation product. The aqueous solution of sodium hydroxide alone was added suitably to maintain the pH at 12, and stirring continued for two hours. Thereafter, a complex hydroxide was particle-grown by standing still at 50° C. for 12 hours or more. After the reaction ended, the complex hydroxide was filtered, washed with water, taken out and dried overnight inside an oven at 120° C. to obtain a powder sample of complex hydroxide. The obtained complex hydroxide powder and a lithium hydroxide powder were mixed in such a way that the ratio ML/ME between the number of moles ML (mol) of lithium and the total number of moles ME (mol) of the transition metal elements (Ni, Mn and Co) was 1.04. This mixed powder was pressure-molded at a pressure of 6 MPa into pellets of 2 cm in diameter and 5 mm in thickness, increased in temperature over two hours to a temperature of 930° C. inside an electric oven with air atmosphere, and the mixture was fired at that temperature for 13 hours to obtain the complex oxide of Example 1 (positive electrode active material for a non-aqueous secondary battery). After firing, the power to the heater was shut to let it cool spontaneously. Approximately 8 hours later, the oven internal temperature was confirmed to be 100° C. or lower, and the pellets were taken out. The following tests were performed for the sample synthesized by the method described above.

(X-Ray Diffraction Measurements)

Powder X-ray diffraction measurements of the sample were carried out. The measurements were carried out using an X-ray diffractometer (RINT2200, manufactured by Rigaku), which used a CuKα beam (wavelength: 0.154051 nm) as the radiation. Measurements were carried out by using a single crystal monochromator of graphite for the monochromatization of the X-ray, and setting the applied voltage to 40 kV and 30 mA current. In addition, for the measurements, measurements were carried out at a scanning speed of 3°/min with an angular range of 2θ of 10° to 100°. The $S_F$ value ($=R_H/R_I$) was calculated from the integrated intensity ratio $R_I$ ($=I_A/I_B$) and the peak intensity ratio $R_H$ ($=H_A/H_B$) of the diffraction peak A located at a diffraction angle 2θ of 17° to 20° and the diffraction peak B located at a diffraction angle 2θ of 43° to 46° when X-ray diffraction measurements are performed using a Cu tube. Peaks A and B are respectively diffraction peaks (003) and (104) when assigned in a hexagonal system of the space group R-3m, and by optimizing the data from the diffraction angle and the Miller indices of each diffraction peak using the least square method, the distance D (nm) between the transition metal layers was calculated.

(SEM Observation)

The sample was observed with a SEM (S-3600N, manufactured by Hitachi High Technologies). From the observed images, 10 primary particles were chosen arbitrarily, the maximum diameter of these primary particles was $L_H$ (μm), the minimum diameter was $L_W$ (μm), and the mean value of the $L_H/L_W$ ratio for 10 particles served as the $R_L$ value.

(Identification of the Sample)

Figure 2:
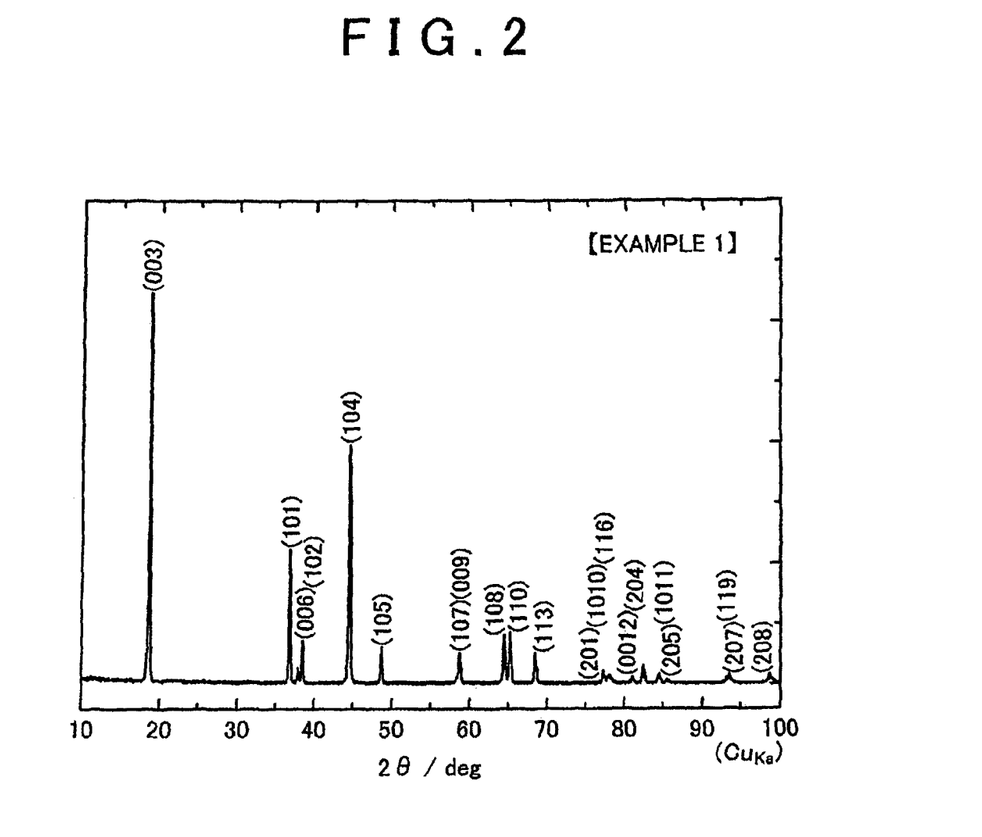
FIG. 2 shows X-ray diffraction measurement results from Example 1.
Figure 3:
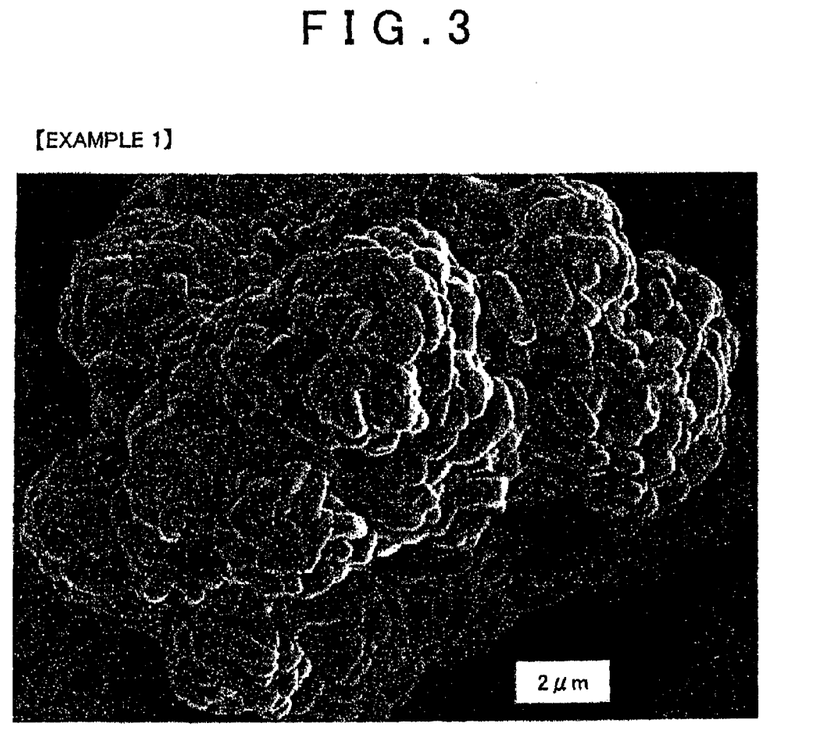
FIG. 3 shows a scanning electron microscope (SEM) observation results from Example 1.

FIG. 2 is the X-ray diffraction measurement result of Example 1. In addition, FIG. 3 is the SEM observation result of Example 1. When the X-ray diffraction peaks and SEM images of the sample of Example 1 were analyzed, the $S_F$ value was 1.12, the $R_L$ value was 1.87 and the D value was 0.4741 nm.

(Test Battery)

With the sample obtained in Example 1 serving as the positive electrode active material, 85 mass % of the active material, 10 mass % of carbon black serving as the conductive material and 5 mass % of PVDF serving as the binding material were mixed, suitable amounts of N-methyl-2-pyrrolidone serving as the dispersion material were added and dispersed to be turned into mixtures in slurry form. These mixtures in slurry form were coated uniformly on both sides of a 20 μm-thick aluminum foil collector and heat-dried to prepare a coated sheet. Thereafter, the coated sheet was passed through a roll press to be densified, cut-out into a 52 mm-wide×450 mm-long shape, which served as a positive electrode sheet. Using graphite as the negative electrode active material, 95 mass % of the active material and 5 mass % of PVDF serving as the binding agent were mixed to be turned into a mixture in slurry form similarly to the positive electrode. These mixtures in slurry form were coated uniformly on both sides of a 10 μm-thick copper foil collector, and heat-dried to prepare a coated sheet. Thereafter, the coated sheet was passed through a roll press to be densified, cut-out into a 54 mm-wide×500 mm-long shape, which served as a negative electrode sheet. The positive electrode sheet and the negative electrode sheet described above were rolled by sandwiching a 56 mm-wide and 25 μm-thick polyethylene separator to prepare in roll-shaped electrode body. This electrode body was inserted into a 18650-type cylindrical case and impregnated with a non-aqueous electrolytic solution and then the case was sealed to prepare a cylindrical lithium secondary battery. For the non-aqueous electrolytic solution, one in which $LiPF_6$ has been dissolved at a concentration of 1 M in a mixed solvent in which ethylene carbonate and diethyl carbonate are mixed so as to have 30:70 in volume % was used.

(Charge-Discharge Cycle Test)

The charge-discharge cycle test was one in which one cycle was a charge-discharge of which charging was carried out to the upper limit voltage 4.1 V at a constant current of 2 $mA/cm^2$ current density and then discharging was carried out to the discharge lower limit voltage 3.0 V at a constant current of 2 $mA/cm^2$ current density under the temperature condition of 60° C. regarded as the upper limit of the actual operating temperature range of a battery, and this cycle was carried out for a total of 500 cycles. At each cycle, the discharge capacity was measured for each lithium secondary battery.

(Evaluation of Capacity Retention)

With the first discharge capacity of the charge-discharge cycle test serving as the initial discharge capacity, the capacity retention was calculated using the formula {discharge capacity after 500 cycles/initial discharge capacity× 100%}.

(Evaluation of Internal Resistance Increase Rate)

After the battery was adjusted to a state of charge of 60% (SOC=60%) of the battery capacity, currents at 0.5 A, 1 A, 2 A, 3 A and 5 A were flown at 25° C. measurement temperature, and the battery voltages after 10 seconds were measured. The flown current and the voltage were linearly approximated and the IV resistance, that is the battery internal resistance, was determined from the slope thereof. The internal resistance increase rate was calculated using the formula [(resistance after 500 cycles−initial resistance)/ initial resistance×100%].

(Low-Temperature, High-Rate Discharge Capability Evaluation)

After the battery was adjusted to a state of charge of 30% (SOC=30%) of the battery capacity, it was held for a fixed time under an environment of −30° C. measurement temperature, the time required to discharge to the lower limit voltage 2.2 V at a current of 3 A was calculated.

Example 2

The complex oxide obtained through a similar process to Example 1, except that the raw material powders were adjusted so that ML/ME was 1.18 and firing was performed at a temperature of 980° C. for 13 hours, served as the complex oxide of Example 2. When the X-ray diffraction peaks and SEM images of this sample were analyzed, the $S_F$ value was 1.14, the $R_L$ value was 1.36 and the D value was 0.4749.

Example 3

The complex oxide obtained through a similar process to Example 1, except that the raw material powders were adjusted so that ML/ME was 1.1 and firing was performed at a temperature of 970° C. for 14 hours, served as the complex oxide of Example 3. When the X-ray diffraction peaks and SEM images of this sample were analyzed, the $S_F$ value was 1.15, the $R_L$ value was 1.62 and the D value was 0.4739.

Example 4

The complex oxide obtained through a similar process to Example 1, except that the raw material powders were adjusted so that ML/ME was 1.16 and firing was performed at a temperature of 920° C. for 13 hours, served as the complex oxide of Example 4. When the X-ray diffraction peaks and SEM images of this sample were analyzed, the $S_F$ value was 1.38, the $R_L$ value was 1.75 and the D value was 0.4745.

Example 5

The complex oxide obtained through a similar process to Example 1, except that the raw material powders were adjusted so that ML/ME was 1.23 and firing was performed at a temperature of 980° C. for 12 hours, served as the complex oxide of Example 5. When the X-ray diffraction peaks and SEM images of this sample were analyzed, the $S_F$ value was 1.41, the $R_L$ value was 1.40 and the D value was 0.4743.

Example 6

The complex oxide obtained through a similar process to Example 1, except that the raw material powders were adjusted so that ML/ME was 1.08 and firing was performed at a temperature of 920° C. for 11 hours, served as the complex oxide of Example 6. When the X-ray diffraction peaks and SEM images of this sample were analyzed, the $S_F$ value was 1.44, the $R_L$ value was 2.01 and the D value was 0.4742.

Example 7

The complex oxide obtained through a similar process to Example 1, except that the raw material powders were adjusted so that ML/ME was 1.14 and firing was performed at a temperature of 900° C. for 11 hours, served as the complex oxide of Example 7. When the X-ray diffraction peaks and SEM images of this sample were analyzed, the $S_F$ value was 1.73, the $R_L$ value was 1.93 and the D value was 0.4736.

Example 8

The complex oxide obtained through a similar process to Example 1, except that the raw material powders were adjusted so that ML/ME was 1.26 and firing was performed at a temperature of 960° C. for 10 hours, served as the complex oxide of Example 8. When the X-ray diffraction peaks and SEM images of this sample were analyzed, the $S_F$ value was 1.75, the $R_L$ value was 1.39 and the D value was 0.4746.

Example 9

The complex oxide obtained through a similar process to Example 1, except that the raw material powders were adjusted so that ML/ME was 1.27 and firing was performed at a temperature of 890° C. for 13 hours, served as the complex oxide of Example 9. When the X-ray diffraction peaks and SEM images of this sample were analyzed, the $S_F$ value was 1.76, the $R_L$ value was 1.55 and the D value was 0.4741.

Example 10

The complex oxide obtained through a similar process to Example 1, except that the raw material powders were adjusted so that ML/ME was 1.33 and firing was performed at a temperature of 890° C. for 10 hours, served as the complex oxide of Example 10. When the X-ray diffraction peaks and SEM images of this sample were analyzed, the $S_F$ value was 2.12, the $R_L$ value was 1.65 and the D value was 0.4740.

Example 11

The complex oxide obtained through a similar process to Example 1, except that the raw material powders were adjusted so that ML/ME was 1.22 and firing was performed at a temperature of 880° C. for 12 hours, served as the complex oxide of Example 11. When the X-ray diffraction peaks and SEM images of this sample were analyzed, the $S_F$ value was 2.16, the $R_L$ value was 2.07 and the D value was 0.4741.

Example 12

The complex oxide obtained through a similar process to Example 1, except that the raw material powders were adjusted so that ML/ME was 1.28 and firing was performed at a temperature of 910° C. for 11 hours, served as the complex oxide of Example 12. When the X-ray diffraction peaks and SEM images of this sample were analyzed, the Sp value was 2.18, the $R_L$ value was 1.46 and the D value was 0.4739.

Example 13

The complex oxide obtained through a similar process to Example 1, except that the raw material powders were adjusted so that ML/ME was 1.12 and firing was performed at a temperature of 880° C. for 12 hours, served as the complex oxide of Example 13. When the X-ray diffraction peaks and SEM images of this sample were analyzed, the $S_F$ value was 1.93, the $R_L$ value was 2.11 and the D value was 0.4751.

Example 14

The complex oxide obtained through a similar process to Example 1, except that the raw material powders were adjusted so that ML/ME was 1.11 and firing was performed at a temperature of 870° C. for 13 hours, served as the complex oxide of Example 14. When the X-ray diffraction peaks and SEM images of this sample were analyzed, the $S_F$ value was 1.98, the $R_L$ value was 2.18 and the D value was 0.4746.

Comparative Example 1

The complex oxide obtained through a similar process to Example 1, except that the raw material powders were adjusted so that ML/ME was 1.02 and firing was performed at a temperature of 1,100° C. for 16 hours, served as the complex oxide of Comparative Example 1. When the X-ray diffraction peaks and SEM images of this sample were analyzed, the $S_F$ value was 1.05, the $R_L$ value was 1.28 and the D value was 0.4780.

Comparative Example 2

The complex oxide obtained through a similar process to Example 1, except that the raw material powders were adjusted so that ML/ME was 1.03 and firing was performed at a temperature of 1,050° C. for 14 hours, served as the complex oxide of Comparative Example 2. When the X-ray diffraction peaks and SEM images of this sample were analyzed, the $S_F$ value was 1.08, the $R_L$ value was 1.24 and the D value was 0.4782.

Comparative Example 3

The complex oxide obtained through a similar process to Example 1, except that the raw material powders were adjusted so that ML/ME was 1.51 and firing was performed at a temperature of 800° C. for 14 hours, served as the complex oxide of Comparative Example 3. When the X-ray diffraction peaks and SEM images of this sample were analyzed, the $S_F$ value was 2.22, the $R_L$ value was 2.20 and the D value was 0.4731.

Comparative Example 4

The complex oxide obtained through a similar process to Example 1, except that the raw material powders were adjusted so that ML/ME was 1.52 and firing was performed at a temperature of 750° C. for 13 hours, served as the complex oxide of Comparative Example 4. When the X-ray diffraction peaks and SEM images of this sample were analyzed, the $S_F$ value was 2.29, the $R_L$ value was 2.12 and the D value was 0.4729.

The $S_F$ values, $R_L$ values, D values and battery characteristics for the samples of Examples 1 to 14 and Comparative Examples 1 to 4 are shown together in Table 1. The elemental composition formula is $Li_{1+Z}(Ni_{0.33}Mn_{0.33}Co_{0.33})_{1-Z}O_2$ ($0 \leq Z \leq 0.2$) for these samples of Examples 1 to 14 and Comparative Examples 1 to 4. As shown in Table 1, the samples for which the $S_F$ value, $R_L$ value and D value (nm) are contained in the ranges $1.1 \leq S_F \leq 2.2$, $1.3 < R_L < 2.1$ and $0.4733 \leq D \leq 0.4778$, respectively, were found to demonstrate excellent battery performance and the low temperature discharge characteristics tended to improve as the $S_F$ value increased. For Examples 13 and 14, although the $R_L$ value was $R_L > 2.1$, $1.1 \leq S_F \leq 2.2$ was satisfied and relatively satisfactory characteristics were demonstrated. However, the battery characteristics of Examples 1 to 12, which satisfy $1.3 < R_L < 2.1$, were found to be higher. When synthesizing complex oxides which elemental composition formula was $Li_{1+Z}(Ni_{0.33}Mn_{0.33}Co_{0.33})_{1-Z}O_2$, it was found that, while synthesis was possible from 800° C. to 1,100° C., when the synthesis temperature was above 1,050° C. or below 800° C., satisfactory characteristics could not be obtained, such that synthesis at 850° C. or higher but 1,000° C. or lower was desirable.

TABLE 1

|  | $S_F$ value[1] | $R_L$ value[2] | D value[3] (nm) | Low-temperature discharge time (s) | High-temperature durability Resistance increase % | High-temperature durability Capacity retention % |
|---|---|---|---|---|---|---|
| Example 1 | 1.12 | 1.87 | 0.4741 | 4.8 | 25.4 | 84.8 |
| Example 2 | 1.14 | 1.36 | 0.4749 | 4.6 | 27.5 | 82.2 |
| Example 3 | 1.15 | 1.62 | 0.4739 | 4.9 | 26.4 | 83.5 |
| Example 4 | 1.38 | 1.75 | 0.4745 | 5.0 | 25.8 | 85.1 |
| Example 5 | 1.41 | 1.40 | 0.4743 | 5.1 | 25.6 | 83.4 |
| Example 6 | 1.44 | 2.01 | 0.4742 | 5.4 | 27.4 | 85.8 |
| Example 7 | 1.73 | 1.93 | 0.4736 | 5.4 | 26.6 | 86.4 |
| Example 8 | 1.75 | 1.39 | 0.4746 | 5.7 | 25.7 | 82.3 |
| Example 9 | 1.76 | 1.55 | 0.4741 | 6.0 | 26.3 | 84.2 |
| Example 10 | 2.12 | 1.65 | 0.4740 | 6.1 | 26.1 | 84.9 |
| Example 11 | 2.16 | 2.07 | 0.4741 | 6.6 | 27.1 | 85.3 |
| Example 12 | 2.18 | 1.46 | 0.4739 | 6.4 | 25.9 | 82.6 |
| Example 13 | 1.93 | 2.11 | 0.4751 | 4.4 | 38.5 | 77.4 |
| Example 14 | 1.98 | 2.18 | 0.4746 | 4.6 | 39.2 | 76.3 |
| Comparative Example 1 | 1.05 | 1.28 | 0.4780 | 2.7 | 47.3 | 66.6 |
| Comparative Example 2 | 1.08 | 1.24 | 0.4782 | 2.9 | 46.1 | 67.4 |
| Comparative Example 3 | 2.22 | 2.20 | 0.4731 | 4.0 | 43.2 | 70.6 |
| Comparative Example 4 | 2.29 | 2.12 | 0.4729 | 3.8 | 44.1 | 71.4 |

[1] $S_F$ value: when the integrated intensity ratio $R_I = I_A/I_B$ and the peak intensity ratio $R_H = H_A/H_B$, between the diffraction peak A located at a diffraction angle 2θ of 17° to 20° and the diffraction peak B located at a diffraction angle 2θ of 43° to 46° are, $S_F = R_H/R_I$
[2] $R_L$ value: when the maximum diameter $L_H$ and the minimum diameter $L_W$ of the primary particles are, $R_L = L_H/L_W$
[3] D value: distance between the transition metal layers of the layered structure
* Elemental composition of the positive electrode active material: $Li_{1+Z}(Ni_{0.33}Mn_{0.33}Co_{0.33})_{1-Z}O_2$

Example 15

Alternatively to the synthesis conditions of Example 1, nickel sulfate and manganese sulfate were adjusted so that each of the Ni and Mn elements was at a molar ratio of 0.5:0.5 to obtain a complex hydroxide. Thereafter, the oxide obtained through a similar process to Example 1, except that the raw material powders were adjusted so that ML/ME was 1.05 and firing was performed at a temperature of 980° C. for 12 hours, served as the complex oxide of Example 15. When the X-ray diffraction peaks and SEM images of this sample were analyzed, the $S_F$ value was 1.13, the $R_L$ value was 1.48 and the D value was 0.4767 nm.

Example 16

The complex oxide obtained through a similar process to Example 15, except that the raw material powders were adjusted so that ML/ME was 1.08 and firing was performed at a temperature of 910° C. for 10 hours, served as the complex oxide of Example 16. When the X-ray diffraction peaks and SEM images of this sample were analyzed, the $S_F$ value was 1.86, the $R_L$ value was 2.06 and the D value was 0.4761.

Example 17

The complex oxide obtained through a similar process to Example 15, except that the raw material powders were adjusted so that ML/ME was 1.12 and firing was performed at a temperature of 890° C. for 12 hours, served as the complex oxide of Example 17. When the X-ray diffraction peaks and SEM images of this sample were analyzed, the $S_F$ value was 2.14, the $R_L$ value was 1.62 and the D value was 0.4757.

Comparative Example 5

The complex oxide obtained through a similar process to Example 15, except that the raw material powders were adjusted so that ML/ME was 1.51 and firing was performed at a temperature of 800° C. for 16 hours, served as the complex oxide of Comparative Example 5. When the X-ray diffraction peaks and SEM images of this sample were analyzed, the $S_F$ value was 1.06, the $R_L$ value was 2.13 and the D value was 0.4781.

Comparative Example 6

The complex oxide obtained through a similar process to Example 15, except that the raw material powders were adjusted so that ML/ME was 1.03 and firing was performed at a temperature of 1,050° C. for 14 hours, served as the complex oxide of Comparative Example 6. When the X-ray diffraction peaks and SEM images of this sample were analyzed, the $S_F$ value was 2.28, the $R_L$ value was 2.17 and the D value was 0.4783.

The $S_F$ values, $R_L$ values, D values and battery characteristics for the samples of Examples 15 to 17 and Comparative Examples 5 and 6 are shown together in Table 2. The elemental composition formula is $Li_{1+Z}(Ni_{0.5}Mn_{0.5})_{1-Z}O_2$ (0≤Z≤0.2) for these samples of Examples 15 to 17 and Comparative Examples 5 and 6. As shown in Table 2, the samples for which the $S_F$ value, $R_L$ value and D value (nm) are contained in the ranges 1.1≤$S_F$≤2.2, 1.3<$R_L$<2.1 and 0.4733≤D≤0.4778, respectively, demonstrated excellent battery performances.

TABLE 2

|  | $S_F$ value[1] | $R_L$ value[2] | D value[3] (nm) | Low-temperature discharge time (s) | High-temperature durability Resistance increase % | High-temperature durability Capacity retention % |
|---|---|---|---|---|---|---|
| Example 15 | 1.13 | 1.48 | 0.4767 | 3.6 | 32.6 | 78.5 |
| Example 16 | 1.86 | 2.06 | 0.4761 | 4.1 | 31.8 | 80.1 |
| Example 17 | 2.14 | 1.62 | 0.4757 | 4.4 | 30.7 | 79.3 |
| Comparative Example 5 | 1.06 | 2.13 | 0.4781 | 2.4 | 52.3 | 63.5 |
| Comparative Example 6 | 2.28 | 2.17 | 0.4783 | 2.8 | 50.6 | 61.5 |

* Elemental composition of the positive electrode active material: $Li_{1+Z}(Ni_{0.5}Mn_{0.5})_{1-Z}O_2$

Example 18

Alternatively to the synthesis conditions of Example 1, nickel sulfate and manganese sulfate were adjusted so that each of the Ni and Mn elements was at a molar ratio of 0.7:0.3 to obtain a complex hydroxide. Thereafter, the oxide obtained through a similar process to Example 1, except that the raw material powders were adjusted so that ML/ME was 1.03 and firing was performed at a temperature of 880° C. for 13 hours, served as the complex oxide of Example 18. When the X-ray diffraction peaks and SEM images of this sample were analyzed, the $S_F$ value was 1.18, the $R_L$ value was 1.65 and the D value was 0.4756 nm.

Example 19

The complex oxide obtained through a similar process to Example 18, except that firing was performed at a temperature of 850° C. for 12 hours, served as the complex oxide of Example 19. When the X-ray diffraction peaks and SEM images of this sample were analyzed, the $S_F$ value was 1.64, the $R_L$ value was 2.03 and the D value was 0.4753.

Example 20

The complex oxide obtained through a similar process to Example 18, except that firing was performed at a temperature of 810° C. for 10 hours, served as the complex oxide of Example 20. When the X-ray diffraction peaks and SEM images of this sample were analyzed, the $S_F$ value was 2.10, the $R_L$ value was 1.47 and the D value was 0.4748.

Comparative Example 7

The complex oxide obtained through a similar process to Example 18, except that firing was performed at a temperature of 700° C. for 11 hours, served as the complex oxide of Comparative Example 7. When the X-ray diffraction peaks and SEM images of this sample were analyzed, the $S_F$ value was 1.06, the $R_L$ value was 2.13 and the D value was 0.4731.

Comparative Example 8

The complex oxide obtained through a similar process to Example 18, except that firing was performed at a temperature of 960° C. for 15 hours, served as the complex oxide of Comparative Example 8. When the X-ray diffraction peaks and SEM images of this sample were analyzed, the $S_F$ value was 2.28, the $R_L$ value was 2.17 and the D value was 0.4779.

The $S_F$ values, $R_L$ values, D values and battery characteristics for the samples of Examples 18 to 20 and Comparative Examples 7 and 8 are shown together in Table 3. The elemental composition formula is $LiNi_{0.7}Mn_{0.3}O_2$ for these samples of Examples 18 to 20 and Comparative Examples 7 and 8. As shown in Table 3, the samples for which the $S_F$ value, $R_L$ value and D value (nm) are contained in the ranges $1.1 \leq S_F \leq 2.2$, $1.3 \leq R_L < 2.1$ and $0.4733 \leq D \leq 0.4778$, respectively, demonstrated excellent battery performances. When synthesizing $LiNi_{0.7}Mn_{0.3}O_2$, while synthesis was possible from 800° C. to 1,000° C., satisfactory characteristics could not be obtained when the synthesis temperature was above 950° C. or below 700° C., and satisfactory characteristics could be obtained when the syntheses were carried out at 750° C. to 900° C.

TABLE 3

| | $S_F$ value[1] | $R_L$ value[2] | D value[3] (nm) | Low-temperature discharge time (s) | High-temperature durability | |
|---|---|---|---|---|---|---|
| | | | | | Resistance increase % | Capacity retention % |
| Example 18 | 1.18 | 1.65 | 0.4756 | 3.8 | 32.6 | 76.2 |
| Example 19 | 1.64 | 2.03 | 0.4753 | 4.0 | 31.8 | 78.4 |
| Example 20 | 2.10 | 1.47 | 0.4748 | 4.2 | 30.7 | 77.8 |
| Comparative Example 7 | 1.06 | 2.13 | 0.4731 | 2.3 | 48.2 | 61.4 |
| Comparative Example 8 | 2.28 | 2.17 | 0.4779 | 2.5 | 46.8 | 59.3 |

* Elemental composition of the positive electrode active material: $LiNi_{0.7}Mn_{0.3}O_2$ Example 21

Alternatively to the synthesis conditions of Example 1, nickel sulfate, manganese sulfate and cobalt sulfate were adjusted so that each of the Ni, Mn and Co elements was at a molar ratio of 0.7:0.2:0.1 to obtain a complex hydroxide. Thereafter, the oxide obtained through a similar process to Example 1, except that the raw material powders were adjusted so that ML/ME was 1.05 and firing was performed at a temperature of 940° C. for 12 hours, served as the complex oxide of Example 21. When the X-ray diffraction peaks and SEM images of this sample were analyzed, the $S_F$ value was 1.11, the $R_L$ value was 1.77 and the D value was 0.4744 nm.

Example 22

The complex oxide obtained through a similar process to Example 21, except that the raw material powders were adjusted so that ML/ME was 1.08 and firing was performed at a temperature of 900° C. for 10 hours, served as the complex oxide of Example 22. When the X-ray diffraction peaks and SEM images of this sample were analyzed, the $S_F$ value was 1.65, the $R_L$ value was 1.47 and the D value was 0.4741.

Example 23

The complex oxide obtained through a similar process to Example 21, except that the raw material powders were adjusted so that ML/ME was 1.12 and firing was performed at a temperature of 860° C. for 11 hours, served as the complex oxide of Example 23. When the X-ray diffraction peaks and SEM images of this sample were analyzed, the $S_F$ value was 2.17, the $R_L$ value was 1.39 and the D value was 0.4738.

Comparative Example 9

The complex oxide obtained through a similar process to Example 21, except that the raw material powders were adjusted so that ML/ME was 1.51 and firing was performed at a temperature of 780° C. for 15 hours, served as the complex oxide of Comparative Example 9. When the X-ray diffraction peaks and SEM images of this sample were analyzed, the $S_F$ value was 1.06, the $R_L$ value was 2.13 and the D value was 0.4732.

Comparative Example 10

The complex oxide obtained through a similar process to Example 21, except that the raw material powders were adjusted so that ML/ME was 1.03 and firing was performed at a temperature of 1,020° C. for 14 hours, served as the complex oxide of Comparative Example 10. When the X-ray diffraction peaks and SEM images of this sample were analyzed, the $S_F$ value was 2.28, the $R_L$ value was 2.17 and the D value was 0.4780.

The $S_F$ values, $R_L$ values, D values and battery characteristics for the samples of Examples 21 to 23 and Comparative Examples 9 and 10 are shown together in Table 4. The elemental composition formula is $Li_{1+Z}(Ni_{0.7}Mn_{0.2}Co_{0.1})_{1-Z}O_2$ ($0 \leq Z \leq 0.2$) for these samples of Examples 21 to 23 and Comparative Examples 9 and 10. As shown in Table 4, the samples for which the $S_F$ value, $R_L$ value and D value (nm) are contained in the ranges $1.1 \leq S_F \leq 2.2$, $1.3 < R_L < 2.1$ and $0.4733 \leq D \leq 0.4778$, respectively, demonstrated excellent battery performances.

TABLE 4

| | $S_F$ value[1] | $R_L$ value[2] | D value[3] (nm) | Low-temperature discharge time (s) | High-temperature durability Resistance increase % | High-temperature durability Capacity retention % |
|---|---|---|---|---|---|---|
| Example 21 | 1.11 | 1.77 | 0.4744 | 4.6 | 29.5 | 81.5 |
| Example 22 | 1.65 | 1.47 | 0.4741 | 4.8 | 28.8 | 80.3 |
| Example 23 | 2.17 | 1.39 | 0.4738 | 5.1 | 28.3 | 79.8 |
| Comparative Example 9 | 1.06 | 2.13 | 0.4732 | 2.9 | 40.4 | 66.8 |
| Comparative Example 10 | 2.28 | 2.17 | 0.4780 | 3.4 | 39.2 | 64.7 |

* Elemental composition of the positive electrode active material: $Li_{1+Z}(Ni_{0.7}Mn_{0.2}Co_{0.1})_{1-Z}O_2$

Example 24

Alternatively to the synthesis conditions of Example 1, nickel sulfate, manganese sulfate, cobalt sulfate and aluminum nitrate were adjusted so that each of the Ni, Mn, Co and Al elements was at a molar ratio of 0.33:0.33:0.23:0.1 to obtain a complex hydroxide. Thereafter, the complex oxide obtained through a similar process to Example 1, except that the raw material powders were adjusted so that ML/ME was 1.16 and firing was performed at a temperature of 980° C. for 13 hours, served as the complex oxide of Example 24. When the X-ray diffraction peaks and SEM images of this sample were analyzed, the $S_F$ value was 1.14, the $R_L$ value was 1.82 and the D value was 0.4752 nm.

Example 25

The complex oxide obtained through a similar process to Example 24, except that the raw material powders were adjusted so that ML/ME was 1.23 and firing was performed at a temperature of 930° C. for 10 hours, served as the complex oxide of Example 25. When the X-ray diffraction peaks and SEM images of this sample were analyzed, the $S_F$ value was 1.64, the $R_L$ value was 1.53 and the D value was 0.4748.

Example 26

The complex oxide obtained through a similar process to Example 24, except that the raw material powders were adjusted so that ML/ME was 1.32 and firing was performed at a temperature of 880° C. for 11 hours, served as the complex oxide of Example 26. When the X-ray diffraction peaks and SEM images of this sample were analyzed, the $S_F$ value was 2.18, the $R_L$ value was 1.32 and the D value was 0.4744.

Comparative Example 11

The complex oxide obtained through a similar process to Example 24, except that the raw material powders were adjusted so that ML/ME was 1.51 and firing was performed at a temperature of 800° C. for 14 hours, served as the complex oxide of Comparative Example 11. When the X-ray diffraction peaks and SEM images of this sample were analyzed, the $S_F$ value was 1.07, the $R_L$ value was 1.23 and the D value was 0.4730.

Comparative Example 12

The complex oxide obtained through a similar process to Example 24, except that the raw material powders were adjusted so that ML/ME was 1.04 and firing was performed at a temperature of 1,050° C. for 16 hours, served as the complex oxide of Comparative Example 12. When the X-ray diffraction peaks and SEM images of this sample were analyzed, the $S_F$ value was 2.31, the $R_L$ value was 2.13 and the D value was 0.4783.

The $S_F$ values, $R_L$ values, D values and battery characteristics for the samples of Examples 24 to 26 and Comparative Examples 11 and 12 are shown together in Table 5. The elemental composition formula is $Li_{1+Z}(Ni_{0.33}Mn_{0.33}Co_{0.2}Al_{0.1})_{1-Z}O_2$ (0≤Z≤0.2) for these samples of Examples 24 to 26 and Comparative Examples 11 and 12. As shown in Table 5, the samples for which the $S_F$ value, $R_L$ value and D value (nm) are contained in the ranges 1.1≤$S_F$≤2.2, 1.3<$R_L$<2.1 and 0.4733≤D≤0.4778, respectively, demonstrated excellent battery performances.

TABLE 5

| | $S_F$ value[1] | $R_L$ value[2] | D value[3] (nm) | Low-temperature discharge time (s) | High-temperature durability Resistance increase % | High-temperature durability Capacity retention % |
|---|---|---|---|---|---|---|
| Example 24 | 1.14 | 1.82 | 0.4752 | 4.8 | 27.6 | 83.2 |
| Example 25 | 1.64 | 1.53 | 0.4748 | 5.1 | 26.8 | 82.6 |
| Example 26 | 2.18 | 1.32 | 0.4744 | 5.4 | 26.3 | 82.3 |
| Comparative Example 11 | 1.07 | 1.23 | 0.4730 | 2.8 | 46.2 | 67.3 |
| Comparative Example 12 | 2.31 | 2.13 | 0.4783 | 3.2 | 43.6 | 70.2 |

* Elemental composition of the positive electrode active material: $Li_{1+Z}(Ni_{0.33}Mn_{0.33}Co_{0.23}Al_{0.1})_{1-Z}O_2$

Example 27

The complex oxide obtained through a similar process to Example 7, except for having been turned into an Nb-added sample, which was synthesized by mixing a niobium oxide ($Nb_2O_5$) powder when adjusting the complex hydroxide powder and the lithium hydroxide powder in the synthesis conditions of Example 7 so that the ratio MN/ME between the number of moles NM of niobium and the total number of moles ME of the transition metal elements (Ni, Mn and Co) was 0.005, served as the complex oxide of Example 27. When the X-ray diffraction peaks and SEM images of this sample were analyzed, the $S_F$ value was 1.72, the $R_1$ value was 1.94 and the D value was 0.4735 nm.

Example 28

The complex oxide obtained through a similar process to Example 7, except for having been turned into an Sr-added sample, which was synthesized by adjusting strontium nitrate so that the ratio MS/ME between the number of moles NS of strontium and the total number of moles ME of the transition metal elements (Ni, Mn and Co) was 0.005 when adjusting nickel sulfate, manganese sulfate and cobalt sulfate in the synthesis conditions of Example 7 to synthesize a complex hydroxide, which was the co-precipitation product, and mixing a lithium hydroxide powder to the complex hydroxide powder so that ML/ME was 1.14, served as the complex oxide of Example 28. When the X-ray diffraction peaks and SEM images of this sample were analyzed, the $S_F$ value was 1.73, the $R_L$ value was 1.91 and the D value was 0.4734.

Example 29

The complex oxide obtained through a similar process to Example 28, except for having been turned into a Zr-added sample, which was synthesized by using zirconium sulfate instead of strontium nitrate in the synthesis conditions of Example 28 and adjusting the ratio MZ/ME between the number of moles MZ of zirconium and the total number of moles ME of the transition metal elements (Ni, Mn and Co) to be 0.002, served as the complex oxide of Example 29. When the X-ray diffraction peaks and SEM images were analyzed, the $S_F$ value was 1.74, the $R_L$ value was 1.92 and the D value was 0.4735.

Example 30

The complex oxide obtained through a similar process to Example 28, except for having been turned into a W-added sample, which was synthesized by using sodium tungstate instead of strontium nitrate in the synthesis conditions of Example 28 and adjusting the ratio MW/ME between the number of moles MW of tungsten and the total number of moles ME of the transition metal elements (Ni, Mn and Co) to be 0.005, served as the complex oxide of Example 30. When the X-ray diffraction peaks and SEM images were analyzed, the $S_F$ value was 1.72, the $R_L$ value was 1.93 and the D value was 0.4736.

Example 31

The oxide obtained through a similar process to Example 28, except for having been turned into a Zr—W-added sample, which was synthesized by adjusting zirconium sulfate and sodium tungstate instead of strontium nitrate in the synthesis conditions of Example 28 so that MZ/ME was 0.002 and MW/ME was 0.005, served as the complex oxide of Example 31. When the X-ray diffraction peaks and SEM images were analyzed, the $S_F$ value was 1.73, the $R_L$ value was 1.92 and the D value was 0.4737.

The $S_F$ values, $R_L$ values, D values, additive element and battery characteristics for the Nb-, Sr-, Zr-, and W-added samples of Examples 27 to 31 are shown together in Table 6. The data for Example 7, which contains no additive element, is also shown in Table 6. The elemental composition formula is $Li_{1+Z}(Ni_{0.33}Mn_{0.33}Co_{0.33})_{1-Z}O_2$ ($0 \leq Z \leq 0.2$) for these samples of Examples 7 and 27 to 31. As shown in Table 6, in these samples of Examples 27 to 31, the $S_F$ value, $R_L$ value and D value (nm) are contained in the ranges $1.1 \leq S_F \leq 2.2$, $1.3 < R_L < 2.1$ and $0.4733 \leq D \leq 0.4778$, respectively, and excellent battery performances were demonstrated. In addition, as shown in Table 6, the battery performance was found to improve further by the addition of an element, such as, Nb, Sr, Zr and W in Example 7, 27 to 31, compared to the results of Example 7, which contains no additive element. In particular, the battery performances improved particularly when Zr or W was added, and the most excellent characteristics were obtained when Zr and W were both added. While the factor that improves the capabilities by addition of an element is still unclear, it was inferred to be working to improve regularity in the layering direction of the layered structure in a micro-domain that is below the limits of XRD detection. In particular, the effect of the addition improving regularity in the layering direction was inferred to be optimized when Zr and W are added.

TABLE 6

| | $S_F$ value[1] | $R_L$ value[2] | D value[3] (nm) | Additive element | Low-temperature discharge time (s) | High-temperature durability Resistance increase % | High-temperature durability Capacity retention % |
|---|---|---|---|---|---|---|---|
| Example 7 | 1.73 | 1.93 | 0.4736 | — | 5.4 | 26.6 | 86.4 |
| Example 27 | 1.72 | 1.94 | 0.4735 | Nb (0.5) | 5.6 | 26.2 | 86.5 |
| Example 28 | 1.73 | 1.91 | 0.4734 | Sr (0.5) | 5.8 | 26.3 | 86.5 |
| Example 29 | 1.74 | 1.92 | 0.4735 | Zr (0.5) | 6.6 | 25.3 | 86.8 |
| Example 30 | 1.72 | 1.93 | 0.4736 | W (0.5) | 6.7 | 25.7 | 86.6 |
| Example 31 | 1.73 | 1.92 | 0.4737 | Zr (0.2) W (0.5) | 7.3 | 24.2 | 87.8 |

* Elemental composition of the positive electrode active material: $Li_{1+Z}(Ni_{0.33}Mn_{0.33}Co_{0.33})_{1-Z}O_2$ In JP 2000-195514 A, regarding the integrated intensity ratio of the diffraction peaks (003) and (104) of a lithium nickel complex oxide, $0.25 \leq I(104)/I(003) \leq 0.9$ is proposed, along with proposing from the ratio of full widths at half maximum of the two diffraction peaks that $0.75 \leq FWHM(003)/FWHM(104) \leq 0.9$ is desirable. It is explained that the integrated intensity ratio of the diffraction peaks (003) and (104) is related to the contamination of Ni ions into Li ion sites and the reactivity of the active material and the electrolytic solution, and that FWHM(003)/FWHM(104) t is related to the c-axis orientation and the crystal growth in a direction perpendicular to the c-axis. In the case of a material that exhibits a c-axis orientation or exhibits crystal growth that is anisotropic in a direction perpendicular to the c-axis, the value of the ratio $R_L$ ($=L_H/L_W$) between the maximum diameter $L_H$ and the minimum diameter $L_W$ of the primary particle is above 2.1. In the invention, the focus was on the relationship between the shape changes in the diffraction peaks A and B assigned to the diffraction peaks (003) and (104) in an hexagonal system and the layering pattern of the transition metal layers, and excellent battery performances were found to be achieved when the optimal range $1.1 \leq S_F \leq 2.2$ of the $S_F$ value was satisfied. In addition, because the primary particles become near-spherical with the influence of the interactions in the layering direction and thereby satisfy $R_L < 2.1$, improvement of battery performance was realized. Thus, the technical ideas are different from the JP 2000-195514 A. In addition, it is meant in WO2002/078105 that, when the integrated intensity ratio I(003)/I(104) of the diffraction peaks (003) and (104) takes a small value below one, large amounts of nickel ions contaminate the lithium layer, and excellent battery performance cannot be obtained. Consequently, the ideas are completely different from the invention, which realized improvement of battery performance by defining, regarding the relationship between the shape changes in the diffraction peaks A and B assigned to the diffraction peaks (003) and (104) in a hexagonal system and laying form of the transition metal layers, the $S_F$ value calculated as $S_F=R_H/R_I$ from the integrated intensity ratio $R_I=I_A/I_B$ and the peak intensity ratio $R_H=H_A/H_B$, and optimizing the interactions in the layering direction of the transition metal layers.

The invention can be used in the battery industry.

The invention claimed is:

1. A positive electrode active material for a non-aqueous secondary battery, comprising:
   a crystal particle of lithium transition metal oxide containing at least a nickel element and a manganese element as transition metals, and having a layered structure,
   wherein with respect to a first diffraction peak located at a diffraction angle 2θ of 17° to 20° and a second diffraction peak located at a diffraction angle 2θ of 43° to 46° when an X-ray diffraction measurement is performed on a crystal structure of the crystal particle using a Cu tube, when a first integrated intensity of the first diffraction peak is defined as $I_A$, a second integrated intensity of the second diffraction peak is defined as $I_B$, an integrated intensity ratio between the first integrated intensity and the second integrated intensity is defined as $R_1$, a first height of the first diffraction peak is defined as $H_A$, a second height of the second diffraction peak is defined as $H_B$, and a peak intensity ratio between the first height and the second height is defined as $R_H$, the following relationships are satisfied:

$Ri=I_A/I_B$ $R_H=H_A/H_B$ $S_F=R_H/R_I$, and $1.1<S_F\leq2.2$ wherein when a maximum diameter and a minimum diameter of a primary particle of the lithium transition metal oxide, a ratio between the maximum diameter and the minimum diameter are defined as $L_H$, $L_W$, $R_L$, respectively, the following relationships are satisfied:

$R_L=L_H/L_W$, and $1.3<R_L<2.1$.

2. The positive electrode active material for the non-aqueous secondary battery according to claim 1, wherein when a distance between transition metal layers of the layered structure of the lithium transition metal oxide is defined as D, the following relationships is satisfied:

0.4733 nm≤D≤0.4778 nm.

3. The positive electrode active material for the non-aqueous secondary battery according to claim 1, wherein the lithium transition metal oxide is represented by a composition formula $Li_{1+Z}(Ni_{1-X-Y}Mn_XM_Y)_{1-Z}O_2$, M is at least one element among Co, Al, Fe, Cr and Mg, and the following relationships are satisfied:

$0\leq Z\leq0.2$, $0<X<0.5$, and $0<Y<0.4$.

4. The positive electrode active material for the non-aqueous secondary battery according to claim 3, wherein M is Co.

5. The positive electrode active material for the non-aqueous secondary battery according to claim 1, wherein the lithium transition metal oxide is doped with at least one element among Zr, W, Sr and Nb.

6. The positive electrode active material for the non-aqueous secondary battery according to claim 1, wherein the lithium transition metal oxide is doped with Zr and W.

7. A non-aqueous lithium secondary battery comprising:
   a positive electrode containing the positive electrode active material according to claim 1;
   a negative electrode storing/releasing lithium; and
   a non-aqueous ion-conducting medium that is intercalated between the positive electrode and the negative electrode, and conducting lithium.

* * * * *